Sept. 6, 1949.        J. M. HALL        2,481,418
METHOD OF AND APPARATUS FOR
DEHYDRATING LIQUID PRODUCTS
Filed Aug. 28, 1944
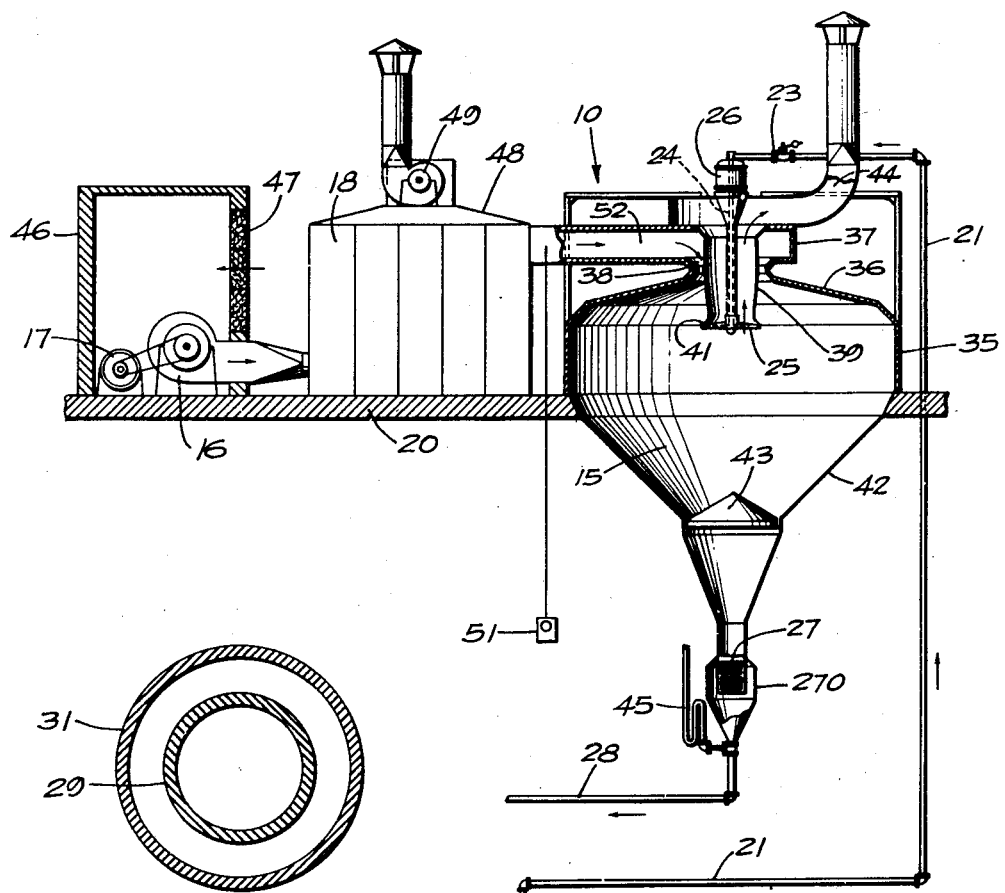
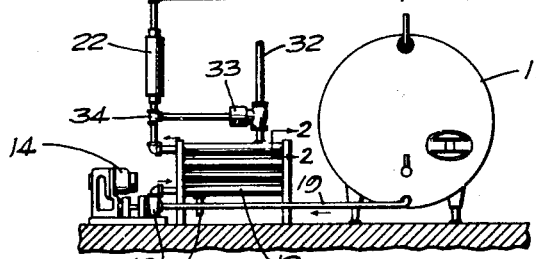
Fig. 2
Fig. 1
INVENTOR.
Joseph M. Hall
BY
Mann, Brown & Co.
ATTYS.

Patented Sept. 6, 1949

2,481,418

UNITED STATES PATENT OFFICE 2,481,418

METHOD OF AND APPARATUS FOR DEHYDRATING LIQUID PRODUCTS

Joseph M. Hall, Chicago, Ill., assignor to Drying & Concentrating Company, a corporation of Delaware Application August 28, 1944, Serial No. 551,597

14 Claims. (Cl. 99—203)

This invention relates to an apparatus for and method of concentrating food and other products, and more particularly to a system in which the liquid product to be treated is processed before it is concentrated or dehydrated.

One of the objects of the invention is the provision of new and improved means for treating liquid products by flash heating or instantaneous heating of the liquid product to a comparatively high temperature under superatmospheric pressure, together with means for immediately thereafter cooling, concentrating and dehydrating the product.

Another object of the invention is the provision of a new and improved method of treating and evaporating a liquid product so that an extremely large percentage of the vitamins contained therein will be retained and harmful bacteria and enzymes will be destroyed, whereby the characteristic qualities of taste and smell of the product will be retained intact over comparatively long periods of time.

A still further object of the invention is the provision of mechanism for instantaneously heating the liquid product to a comparatively high temperature for only a few seconds, and instantaneously reducing the temperature, and then concentrating and dehydrating the product whereby certain objectionable bacteria and enzymes will be destroyed without injuriously affecting the vitamins contained in the product and the dehydrated powdered product will keep over a long period of time.

Another object of the invention is the provision of new and improved mechanism for treating, concentrating and dehydrating liquid products that is simple in construction, easily installed, and that is efficient in operation.

Other and further objects and advantages of the invention will appear from the following description, taken in connection with the accompanying drawings in which Fig. 1 is a side elevation of an apparatus for treating liquid food products, with parts in section and parts broken away, and shown more or less diagrammatically; and Fig. 2 is a section on the line 2—2 of Fig. 1.

Under favorable conditions of heat and moisture the growth of bacteria in certain food products, as, for instance, milk, is rapid and reaches enormous proportions in short spaces of time. Likewise, under such conditions enzymic action is very prominent. As a result chemical changes in the product are very rapid, especially in liquid products, and even though the product be dehydrated the chemical changes that may take place before this operation can be performed may be such as to have a deleterious effect on taste, odor, and other qualities of the product. It is well known that heat will destroy bacteria and enzymes that cause such changes, but spores of certain objectionable bacteria will withstand considerable amounts of heat. These latter may not develop if the product be dehydrated.

In heating certain liquid products, as, for instance, milk, temperatures even below the boiling point of water, under certain conditions as when prolonged, may cause chemical changes in the product. It has been found, however, that the temperatures of such products may be elevated momentarily considerably above the boiling point of water and of milk, as an example, even to 225° F., or in some liquids, like fruit juices, to 240° F., if the liquid is under sufficient pressure to prevent boiling, and if immediately thereafter the liquid be cooled to below the boiling point of the liquid at atmospheric pressure. These products may be sterilized at lower temperatures if the heat period be extended. For instance, milk may be pasteurized at from 145° to 150° F. if the temperatures are maintained for a period of thirty minutes.

The present invention has for its principal object the momentary heating of liquid products under pressure to temperatures sufficiently high to destroy objectionable bacteria, and to prevent enzymic action without seriously affecting the vitamins, or, at least, most of them.

The temperatures and pressures employed in treating the product will necessarily vary with the nature of the different liquid products treated, but for the purpose of illustrating one embodiment of the apparatus, and for disclosing a method of treating a liquid product, liquid milk is taken as an example, and the method of and an apparatus for treating milk will now be described.

Referring now to the drawing, the reference character 10 designates a concentrating or dehydrating plant having a liquid product reservoir 11, an instantaneous heater 12, a pump or compressor 13, a motor 14 therefor, a concentrator or dehydrator chamber 15, and air blower 16 operated by a motor 17, and a furnace or heater 18 for heating the air supplied by the blower 16 to the concentrator 15.

The milk is stored in the reservoir 11, and, during the operation of the apparatus, is conducted by the conduit 19 to the pump or compressor 13, which places the same under pressure and pumps the liquid through the instantaneous heater 12 in which the milk is heated to around 225° under about a thirty pound pressure in a few seconds, probably not over five seconds or even less. The milk passes from the instantaneous heater into a conduit 21 through a screen 22. The screen 22 is not necessary when milk is dehydrated. It is used principally in liquid products in which some semi-solids or jelly-like materials are formed in the body of the liquid, and this screen separates out all, or a greater portion, of this semi-solid material. It is found in the dehydration of eggs, for instance, that a jelly-like substance is formed when the material is liquefied, and most of this can be removed by the screen 22.

The milk under pressure passes along the conduit 21 through a pressure regulator member 23, which is set to hold the pressure at about two atmospheres, or about thirty pounds. Immediately thereafter the liquid is conducted downward through the hollow stem 24 of a spray head 25. This spray head has radially extending arms terminating in spray nozzles for atomizing the liquid product. This head is substantially the same as that shown in my Patent No. 2,217,547, of October 8, 1940, and functions in the same manner. The spray head 25 is rotated in the usual manner by a motor 26, the stem 24 of which constitutes an extension of the motor shaft. The release of the pressure at 23, permitting the formation of steam, and the prompt spraying of the liquid product thereafter by the rotating spray head 25 into a current of heated air in the chamber 15, instantaneously reduces the temperature of the product by evaporation to a point, say, around 130° F., where the heat will not injuriously affect the milk particles.

In this way it will be seen that the milk has been almost instantaneously heated to around 225° as it passes through the heater 12, and is almost instantaneously cooled with flash action by having the pressure removed, converting the same into a spray by the centrifugal action of the spray head 25, and immediately thereafter evaporating moisture from the product. This expansion of the liquid by the action of the spray head 25 into a current of heated air enormously expands and evaporates the material, thus reducing its temperature to a point where it will not be injuriously affected by the heat.

A large proportion of the water will be removed from the milk within the concentrator 15, as will presently appear, and the concentrate will pass downwardly through a filter 27 in the enlarged chamber 270 into a conduit 28, which will conduct the concentrate to a receptacle or over to a dehydrator, where it may be converted into a powder in a chamber similar to or identical with the concentrating chamber 15. The filter is not necessary in dehydrating or concentrating milk, but in certain products where semi-solid or jelly-like compositions form in the product this filter will remove any such material that may have passed the screen 22. The dehydrator chamber is not shown, because it is of substantially the same form as that illustrated in my patent referred to above.

The instantaneous heater 12 may be of any suitable construction, that shown being of the multiple tube type in which the inner tube 29 (Fig. 2) is surrounded by a steam pipe 31 containing steam. Steam under suitable pressure, say, around fifty pounds, is supplied through any suitable source through the conduit 32 to the heater 12. The spent steam and condensate are discharged through the conduit 330. The steam may have a temperature of around 281° F., which heats the milk to around 225° F., or other desired temperature, in around five seconds, or even less. The heat applied to the milk is controlled by a thermostatically operated valve 33, which in turn controls the admission of steam to the heater. The valve is controlled by the heat of the liquid product, as at 34, after it passes through the heater 12. Since the thermostat and its connection are of the usual and well known construction, it is not thought necessary to illustrate and describe the same more in detail. The screen 22 is of the conventional type, and it likewise need not be illustrated or described in detail.

The concentrator 15 and spray mechanism are of the type shown in my patent referred to above. The concentrator chamber is slightly different in detail. This concentrator extends through the floor 20, and comprises essentially a chamber having a central circular body portion 35, a top portion 36 that tapers slightly upward and inward to an axial or discharge opening 38, and has a snail 37 connected to the top portion 36 surrounding the opening 38. The opening 38 surrounds a sleeve member 39 which extends downwardly through the opening in the top portion of the concentrator chamber 36 and is flared at its lower end, as at 41. The spray head 25 rotates just beneath the flared portion 41 of the sleeve 39, so that the liquid product that is sprayed radially outwardly from the arms on the spray head 25 will be sprayed into a drying stream of air passing downwardly from the snail 37, as in the construction shown in the patent mentioned above.

The snail will cause the air to rotate, and the rotation of the air will cause the sprayed particles to be thrown by centrifugal action outwardly against the walls of the concentrating chamber 15 so that the concentrated liquid will run down the inclined walls 42 of the concentrating chamber. The air will move downwardly in a rotational direction until it strikes the deflector 43, where it reverses and will move upwardly in an inner spiral, assisted by what may be termed an exhaust fan formed by the arms of the spray head, and will pass outwardly through the sleeve member 39 into a discharge pipe or passage 44. Since no novelty is claimed for the spray head, per se, it is not thought necessary to further illustrate or describe the same. The structure is clearly illustrated in my patent referred to above.

A transparent sight gauge 45 may be attached to the lower end of the concentrator member 15 below the filter 27, as shown more clearly in Fig. 1, for indicating the liquid level of the concentrate in the filter container 27. This gauge comprises a transparent tube which is provided with a U-turn or goose neck, so that the bubbling or foaming of the liquid will not seriously affect the reading of the gauge, as it otherwise would were the conventional straight gauge tube employed.

Suitable means are provided for supplying the concentrator chamber 15 with air at a predetermined temperature. In the form of construction shown, which is by way of example only, the blower 16 is employed for this purpose. The blower is located in a closure 46, which is provided with a window having a filter 47 therein for removing the dust and other foreign matter supplied to the blower and delivered by the blower 16 to the concentrating chamber 15.

Suitable means are provided for heating the air discharged from the blower 16, and before it reaches the snail 37. As shown, the heater 18 is employed for this purpose. The heater is located in a chamber 48, and may be of the gas or liquid fuel type. The furnace or heater is mounted within this chamber, and is preferably provided with a fan 49 which creates a draft for assisting combustion in the heater. Since the heater is of any well known construction for indirectly heating the air through a suitable heat exchanger device, it is not thought necessary to illustrate or describe the details thereof.

Suitable means may be provided for maintaining the temperature of the air passing through the heater into the snail 37 at a predetermined temperature. Where milk is being dehydrated the temperature of the air should probably be around 400° F. as it leaves the furnace or heater 18. The heater may be oil or gas fired, as desired, and any suitable means may be employed for automatically maintaining the temperature at a predetermined amount. The temperature of the fluid that is exhausted from the pipe 44 should be around, say 120° F. The remainder of the heat in the air and product has become latent in vaporizing the moisture removed from the sprayed product. A recording thermometer 51 may be provided for recording the temperature of the air passing through the passage 52 leading from the heater to the snail 37.

While I have shown and described an apparatus and method for concentrating and dehydrating milk, this is by way of example only, and the exact temperatures and pressures mentioned are subject to variations. It is understood that the temperatures and pressures may vary with various products, but the principle remains the same. That is, the liquid product is subjected to heat above the normal boiling point thereof for a few seconds, and at pressures preventing the boiling of the liquid product at such temperatures, and then immediately thereafter promptly releasing the pressure and lowering the temperature by flash action far below the boiling point of the product for destroying enzymes and objectionable bacteria without seriously affecting the vitamins.

The process also includes concentrating or dehydrating the product by spraying the same into a heated current of a gaseous drying medium, for removing moisture from the product and reducing it to a powder, so that bacteria and spores that have not been destroyed by the pressure and heat treatment will not develop and so that the powdered product containing its normal amount of vitamins will keep fresh over long periods of time.

It is thought from the foregoing, taken in connection with the accompanying drawing, that the construction and operation of my device will be apparent to those skilled in the art, and that changes in size, shape, proportion and detail may be made without departing from the spirit and scope of the appended claims.

I claim as my invention:

1. A single-cycle method of treating liquid products such as milk and fruit juices which comprises abruptly heating the product under super-atmospheric pressure to a temperature above the normal boiling point of the liquid for destroying enzymes and bacteria, immediately thereafter flash cooling the liquid by spraying the same into a blast of air at substantially lower pressure for reducing the moisture content of the product.

2. A single-cycle method of dehydrating a liquid food product such as milk or fruit juice which comprises heating said product under pressure in a few seconds to a temperature sufficiently above 200° F. to destroy most of the enzymes and bacteria contained in said product but not sufficiently high to boil the liquid or to injuriously affect the vitamins contained therein, immediately thereafter cooling and concentrating the product by spraying the same into a current of air thereby at a reduced pressure terminating the heat treatment before the quality of the product is adversely affected by the heat, and finally dehydrating the concentrated product.

3. A single-cycle method of dehydrating a liquid product such as milk or fruit juice which comprises instantaneously heating the product above its normal atmospheric boiling point under super-atmospheric pressure sufficient to prevent boiling of the product for a period not exceeding a few seconds, then instantaneously materially reducing the pressure to not above atmospheric, and simultaneously reducing the temperature of the product below its boiling point at atmospheric pressure by evaporating a large portion of the moisture from the product.

4. A single-cycle method of treating and concentrating a liquid product such as milk or fruit juice which comprises suddenly increasing its temperature above its normal boiling point at normal atmospheric pressure while maintaining the liquid product under sufficient pressure to prevent boiling of the heated product, then suddenly reducing the pressure and spraying the product into a rotating current of heated air for removing moisture from the product and for suddenly reducing the temperature of the product to a point materially below the boiling point of the product at atmospheric pressure.

5. A single-cycle method of treating liquid products such as milk and fruit juices which comprises abruptly heating the product under super-atmospheric pressure to a temperature above the normal boiling point of the liquid for destroying enzymes and bacteria, immediately thereafter flash cooling the liquid by spraying the same into a blast of air for reducing the moisture content of the product, and finally dehydrating the product by spraying the same into a current of moving air.

6. A single-cycle method of treating and concentrating milk which comprises flash heating the milk to around 225° F. within a time interval of around five seconds under a pressure of approximately thirty pounds per square inch, immediately thereafter releasing the pressure to around that of the atmosphere, promptly thereafter spraying the milk into a rotating column of air at substantially 400° F. for concentrating the milk, and reducing its temperature instantly to around 130° F. by evaporation of moisture from the milk.

7. A single-cycle method of treating and concentrating milk which comprises flash heating the milk to around 225° F. within a space of around five seconds under a pressure of approximately thirty pounds per square inch, immediately thereafter releasing the pressure to around that of the atmosphere, promptly thereafter spraying the milk into a rotating column of air at substantially 400° F. for concentrating the milk and reducing its temperature instantly to around 130° F. by evaporation of moisture from the milk, and finally reducing the concentrated milk to powdered form by dehydrating the same.

8. A method of treating a liquid food product such as milk or fruit juice having a vitamin content, which includes the steps of forcing the liquid into a restricted passage at a rate to place the liquid therein under sufficient pressure to prevent the liquid from boiling at 212° F., applying heat to raise the temperature of the liquid in said passage in a few seconds to at least 200° F. thereby creating a high temperature zone along the passage for destroying bacteria and enzymes in the liquid, the length of said zone and the rate of fluid flow therethrough being such that increments of liquid therein traverse the passage before the high temperature has any substantial effect on the vitamin content and flavor of the liquid, releasing the liquid from said passage in a finely divided spray into an area of lower pressure thereby flash cooling the liquid and vaporizing a portion of its water content, and subjecting said spray to a blast of air thereby to further vaporize the water content of the liquid.

9. A method of treating a liquid food product such as milk or fruit juice having a vitamin content, which includes the steps of forcing the liquid into a passage thereby to place the liquid under pressure, regulating the flow of liquid through the passage in response to the pressure therein to maintain sufficient pressure to prevent boiling of the liquid at 212° F., applying heat to raise the temperature of the liquid in said passage in a few seconds to at least 212° F. thereby creating a high temperature zone along the passage for destroying bacteria and enzymes in the liquid, the length of said zone and the rate of fluid flow therethrough being such that increments of liquid therein traverse the passage before the high temperature has any substantial effect on the vitamin content and flavor of the liquid, releasing the liquid from said passage in a finely divided spray into an area of lower pressure thereby flash cooling the liquid and vaporizing a portion of its water content, and subjecting said spray to a blast of air thereby to further vaporize the water content of the liquid.

10. A method of treating a liquid food product such as milk or fruit juice having a vitamin content, which includes the steps of forcing the liquid into a passage thereby to place the liquid under pressure, regulating the flow of liquid through the passage in response to the pressure therein to maintain sufficient pressure to prevent boiling of the liquid at 200° F., applying heat to raise the temperature of the liquid abruptly in said zone to a given temperature of at least 200° F., regulating the rate of heat application in response to temperature of the liquid downstream from the point of heat application to maintain said given temperature for destroying bacteria and enzymes in the liquid, releasing the liquid from said passage in the form of a finely divided spray into an area of lower pressure before said given temperature substantially affects the vitamin content and flavor of the liquid thereby flash cooling the liquid and vaporizing a portion of its water content, and subjecting the spray to a blast of air thereby further vaporizing the water content of the liquid.

11. A method of treating a liquid food product such as milk or fruit juice having a vitamin content, which includes the steps of forcing the liquid into a restricted passage at a rate to place the liquid therein under sufficient pressure to prevent the liquid from boiling at 212° F., applying heat to raise the temperature of the liquid in said passage in a few seconds to at least 212° F. thereby creating a high temperature zone along the passage for destroying bacteria and enzymes in the liquid, the length of said zone and the rate of fluid flow therethrough being such that increments of liquid therein traverse the passage before the high temperature has any substantial effect on the vitamin content and flavor of the liquid, releasing the liquid from said passage in a finely divided spray into an area of lower pressure thereby flash cooling the liquid and vaporizing a portion of its water content, and subjecting said spray to a blast of heated air, the rate at which the liquid is sprayed and the rate of flow of the air blast being such that the temperature of the sprayed liquid is instantaneously lowered to less than 140° F.

12. A method of treating a liquid food product such as milk or fruit juice having a vitamin content, which includes the steps of forcing the liquid into a passage, restricting the flow of liquid at a point in the passage to provide a zone in the passage at such pressure as to prevent boiling of the liquid at 200° F., regulating the restriction in response to the elevated pressure of the liquid, applying heat to raise the temperature of the liquid in said zone in a few seconds to at least 200° F. thereby creating a high temperature zone along the passage for destroying bacteria and enzymes in the liquid, the length of said zone and the rate of fluid flow therethrough being such that increments of liquid therein traverse the passage before the high temperature has any substantial effect on the vitamin content and flavor of the liquid, releasing the liquid from said passage in a finely divided spray into an area of lower pressure thereby flash cooling the liquid and vaporizing a portion of its water content, and directing said spray into a blast of heated air having a pressure on the order of atmospheric pressure.

13. In an apparatus for treating a liquid product such as milk or fruit juice having a vitamin content, a concentrator chamber, a passage to convey the liquid to said chamber, means to force the liquid into said passage at a rate to cause sufficient pressure therein to prevent boiling at 200° F., means to raise the temperature of the flowing liquid in said passage in a few seconds to at least 200° F. to destroy bacteria and enzymes in the liquid, the length of the passage and the rate of fluid flow making the time duration of flow through the passage brief to prevent heat destruction of the vitamin content and flavor of the liquid, sprayer means to release the liquid in said concentrator chamber in finely divided form at a reduced pressure thereby flash cooling the liquid and vaporizing a portion of its water content, and means to force a stream of air through said concentrator chamber to further vaporize water content of the liquid.

14. In an apparatus for treating a liquid product such as milk or fruit juice having a vitamin content, a concentrator chamber, a passage to convey the liquid to said chamber, power means to force the liquid into said passage at a rate to create pressure therein, means responsive to pressure in said passage to regulate the rate of flow therethrough to maintain sufficient pressure to prevent boiling of the liquid at 200° F., means to apply heat to the flowing liquid in said passage to raise the temperature of the liquid in a few seconds to at least 200° F., means to regulate the application of such heat in response to the temperature of the liquid in the passage, the rate of fluid flow being sufficiently high and the length of the passage being sufficiently short to prevent such prolongation of the heat treatment as to substantially affect the vitamin content and flavor of the liquid, means to discharge the liquid from said passage into said concentrator chamber in finely divided form thereby flash cooling the liquid and vaporizing a portion of its water content, and means to force a stream of heated gaseous fluid through said chamber at a reduced pressure thereby to further vaporize water content of the liquid.

JOSEPH M. HALL.

REFERENCES CITED

The following references are of record in the file of this patent:

UNITED STATES PATENTS

| Number | Name | Date |
|---|---|---|
| 985,271 | Merrell | Feb. 28, 1911 |
| 1,078,848 | Gray et al. | Nov. 18, 1913 |
| 1,430,312 | Merrell | Sept. 26, 1922 |
| 1,799,478 | Peebles | Apr. 7, 1931 |
| 1,905,263 | Burner | Apr. 25, 1933 |
| 1,914,895 | Peebles | June 20, 1933 |
| 1,977,738 | Olson | Oct. 23, 1934 |
| 2,158,809 | White | May 16, 1939 |

FOREIGN PATENTS

| Number | Country | Date |
|---|---|---|
| 439,595 | Great Britain | Dec. 10, 1935 |

Certificate of Correction

Patent No. 2,481,418 — September 6, 1949

JOSEPH M. HALL

It is hereby certified that errors appear in the printed specification of the above numbered patent requiring correction as follows:

Column 6, line 15, for the words "thereby at a reduced pressure" read *at a reduced pressure thereby*; line 52, after "air" and before "for" insert *at a reduced pressure*; and that the said Letters Patent should be read with these corrections therein that the same may conform to the record of the case in the Patent Office.

Signed and sealed this 10th day of January, A. D. 1950.

[SEAL]

THOMAS F. MURPHY,
*Assistant Commissioner of Patents.*